INVENTOR
JOHN E. COPELAND

BY Claude Funkhouser
ATTORNEY

United States Patent Office 3,262,659
Patented July 26, 1966

3,262,659
THRUST CONTROL APPARATUS
John E. Copeland, Dunwoody, Ga., assignor, by mesne assignments, to the United States of America as represented by the Secretary of the Navy
Filed Apr. 29, 1964, Ser. No. 364,067
23 Claims. (Cl. 244—42)

The present invention relates generally to an improved arrangement of propulsion apparatus and aerodynamic surface configurations which arrangement affords an increase in the lift of a given aircraft. More particularly, the invention relates to a new and improved arrangement of components for use in aircraft which utilize turbo-prop powerplants and boundary layer control type aerodynamic surfaces.

There has been an increased interest by the aircraft industry in aircraft with short field take-off and short field landing characteristics. Due to this interest and the obvious advantages from the standpoint of airport size, various concepts have been employed to enable aircraft to land and take-off in very short distances and in some cases with zero take-off and landing distances. One such method has been to direct the jet of the engine downwardly to lift the aircraft and then at some given altitude redirect the thrust gradually to accelerate the aircraft in horizontal flight. Another method is to employ a turbo-jet aircraft, which lands vertically on its tail, with sufficient power conveyed to the propellers so that the aircraft is capable of rising vertically from the ground, moving into horizontal flight, moving from horizontal flight to a vertical position, and moving vertically for lowering itself to the ground. To acquire only short field take-off characteristics, techniques such as jet assisted take-off arrangements which are basically rockets, are employed. In other instances an aircraft utilizes engines which furnish more power than the aircraft normally requires. To enable aircraft to acquire short field landing characteristics, techniques such as thrust reversal mechanisms have been used. Probably the most noted has been the technique of reversing the pitch of the propeller to acquire a braking action once the aircraft has landed and is rolling on the ground.

There is a need in the art for a system which can be employed on aircraft utilizing some roll for both take-off and landing, and which will enable the aircraft to take off in a minimum roll distance and which will enable the aircraft to land in a minimum roll distance. This need is fulfilled by an aircraft utilizing turbo-jet or turbo-prop powerplants and a boundary layer control system in combination with a power absorption device.

A turbo-jet or turbo-prop powerplant comprises, basically, a compressor through which air passes and is compressed, a combustion chamber to receive and burn fuel with the air received from the compressor, and a turbine. The turbine has more than one stage so that one stage may drive the compressor and the other stage, connected through a shaft in a gear reduction means to a propeller, may drive the propeller, which in turn propels the aircraft. The turbo-jet or tubo-prop powerplant offers an excellent source of high velocity air which may be utilized for boundary layer control purposes by bleeding the high velocity air from the compressor stage of the powerplant. This high velocity air is passed through conduits to the desired points of application such as the wing and tail surfaces of the aircraft. It has been found that with the pressure and quantities of air available from the engine bleed for boundary layer control, the lift of a given aircraft may be increased approximately 60 to 75 percent. This increased lift acquired by utilization of the boundary layer effect control greatly increases the short field take-off and landing characteristics of an aircraft.

The foregoing arrangement, although characterized by highly desirable lift characteristics, has a serious shortcoming in instances or situations when the system is used to accomplish a short field landing. This results from the fact that during the landing phase of an aircraft utilizing such a system, the engine must be operating at a high power rating to furnish sufficient high velocity air for the boundary layer control system to operate. The boundary layer control system is utilized to increase the lift so that the approach speed of the aircraft may be reduced; however, if the propeller remains positively connected to the engine, the necessary result would be, to attain the boundary layer control system operation, that the aircraft would at the same time be receiving increased thrust from the propeller. The problem, however, is solved by utilizing a power absorption device which will absorb the power output of the engine when the engine is operating at the high power rating necessary to funish sufficient high velocity air to the boundary layer control system.

It is therefore the general purpose of this invention to provide an arrangement which embraces all of the advantages of the similarly employed prior art devices and possesses none of the aforedescribed disadvantages. To attain this, the present invention contemplates a unique arrangement of components so as to provide an aircraft with improved short field take-off and landing characteristics.

Accordingly, it is an object of the present invention to provide a system for aircraft which will enable the aircraft to sustain short field take-off and landing characteristics.

Another object of the invention is the provision of an aircraft with short field take-off and landing characteristics which utilizes turbo-prop powerplants and a boundary layer control system operated by gases bled from the compressor of the turbo-prop powerplant.

A further object of the invention is the provision of a power absorption device for use with turbo-prop aircraft utilizing boundary layer effect type control surfaces.

Still another object is to provide a short field take-off and landing turbo-prop aircraft which utilizes boundary layer control in conjunction with a power absorption device which absorption device is inexpensive to manufacture and which may be readily installed and removed from the aircraft should removal become necessary or desirable.

Yet another object of the present invention is to provide a turbo-prop aircraft which utilizes boundary layer control with a power absorption device, the control of which is connected to the controls for varying the pitch of the propeller blades thereby substantially limiting the human element as a factor in aircraft flight performance.

A still further object of the present invention is to provide a turbo-prop aircraft utilizing boundary layer control and a power absorption device which is highly reliable in operation, which has a minimum of malfunction and an overall improvement in take-off and landing performance.

Other objects and many of the attendant advantages of this invention will be readily appreciated as the same becomes better understood by reference to the following detailed description when considered in connection with the accompanying drawings wherein.

Figure 1:
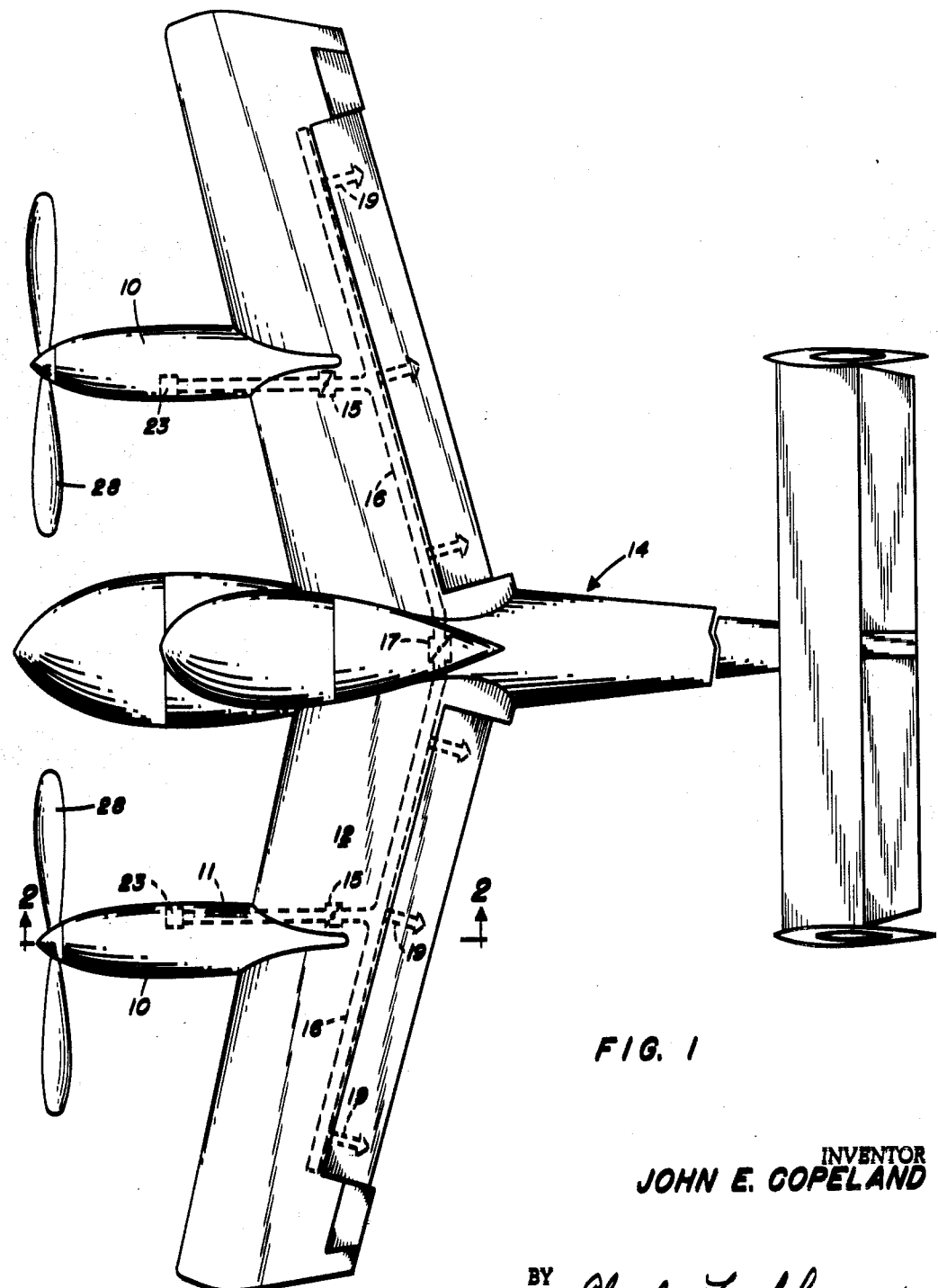
FIG. 1 is a plan view of an aircraft equipped with a boundary layer control system.

Referring now to the drawings, wherein like reference characters designate like or corresponding parts throughout the several views, there is shown in FIG. 1 an aircraft 14 which employs wings 12. The wings 12 support the engine nacelles 10 which house the turbo-prop powerplant and from which compressed air is bled off through a connection 23, through passage 11, through valve 15 to the distribution manifold 16. The cross over valve 17 enables compressed air, from one of the engines, to be passed over to the opposite side of the distribution manifold in the event that the aircraft is forced to operate on the power of one engine. Connected to the distribution manifold 16 are distribution outlets 19 which conduct the high pressure gases to the proper points on the wing so as to effect the desired boundary layer control. The points at which the high pressure gases are distributed on the aerodynamic surfaces of the aircraft depends upon the aerodynamic design of the particular airfoils of the particular aircraft in which the instant system is employed. It is to be understood that the accompanying figures are merely intended to be illustrative of the instant invention and that many variations of high pressure gas distribution may be accomplished; for example, by an additional ducting means connected to valve 17 for ducting of high pressure gases to the tail surfaces of the aircraft.

Figure 2:
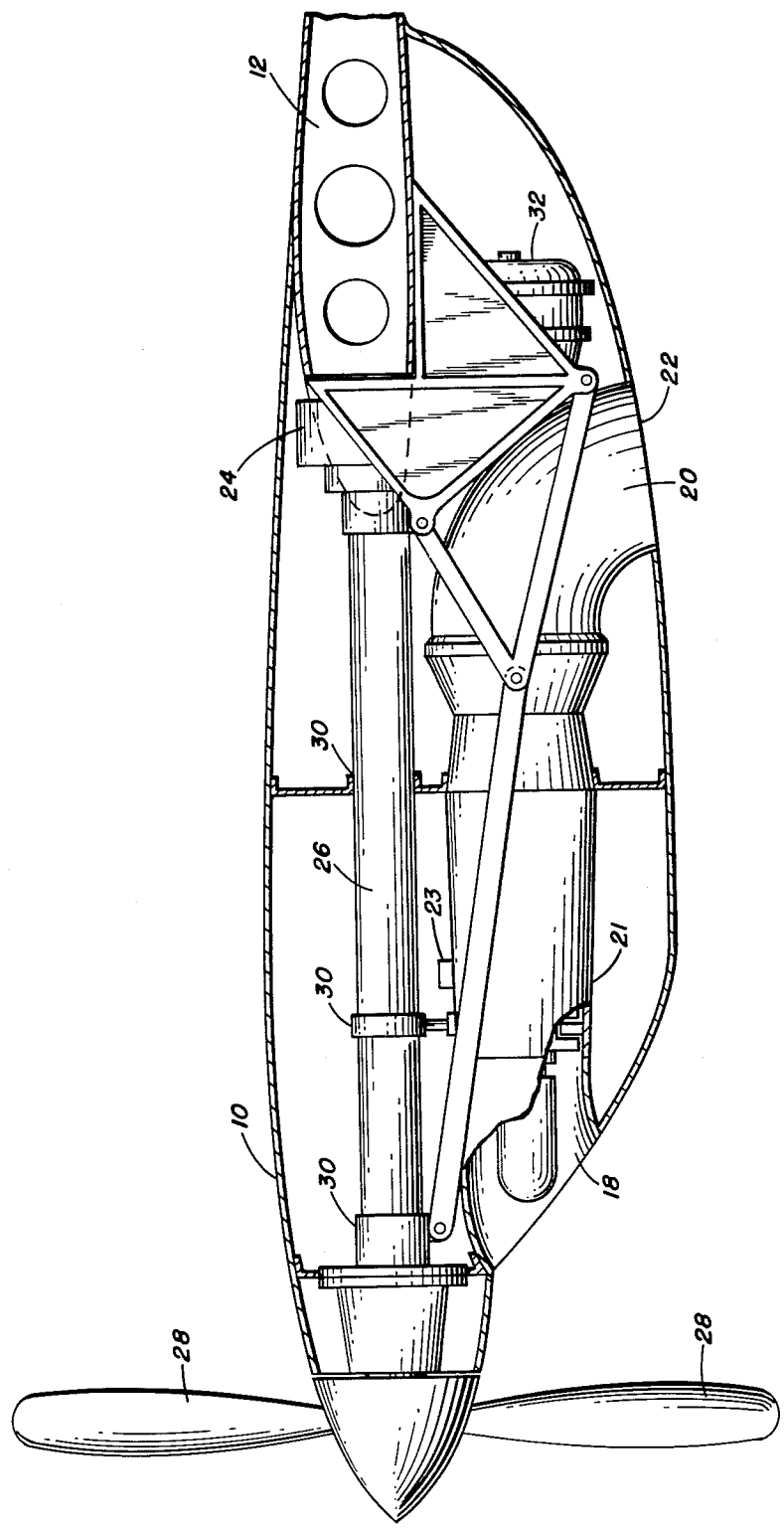
FIG. 2 is a sectional view through the wing of an aircraft, taken along line 2—2 of FIG. 1, illustrating the relative position of the thrust control device with respect to the engine.

In FIG. 2, which is directed to an illustrative embodiment of the present invention, the showing includes the nacelle 10 which is mounted on the wing 12 and which has in the lower half of its forward end an air intake 18. The air intake 18 furnishes an air passage to the compressor of the engine 21. The air is compressed therein, burned with a fuel, passed through the turbine section, and exhausted through the outlet 22. There is provided on the engine 21 an outlet 23 through which compressed gas may be bled off from the compressor of the engine. Power from the engine is transmitted from the turbine through shafting, reduction gearing, and additional shafting to reduction gear box 24 which in turn applies the power through shaft 26, which is supported by the bearings 30, to the propeller 28. Operably connected to gear box 24 is the power absorption device 32.

Figure 3:
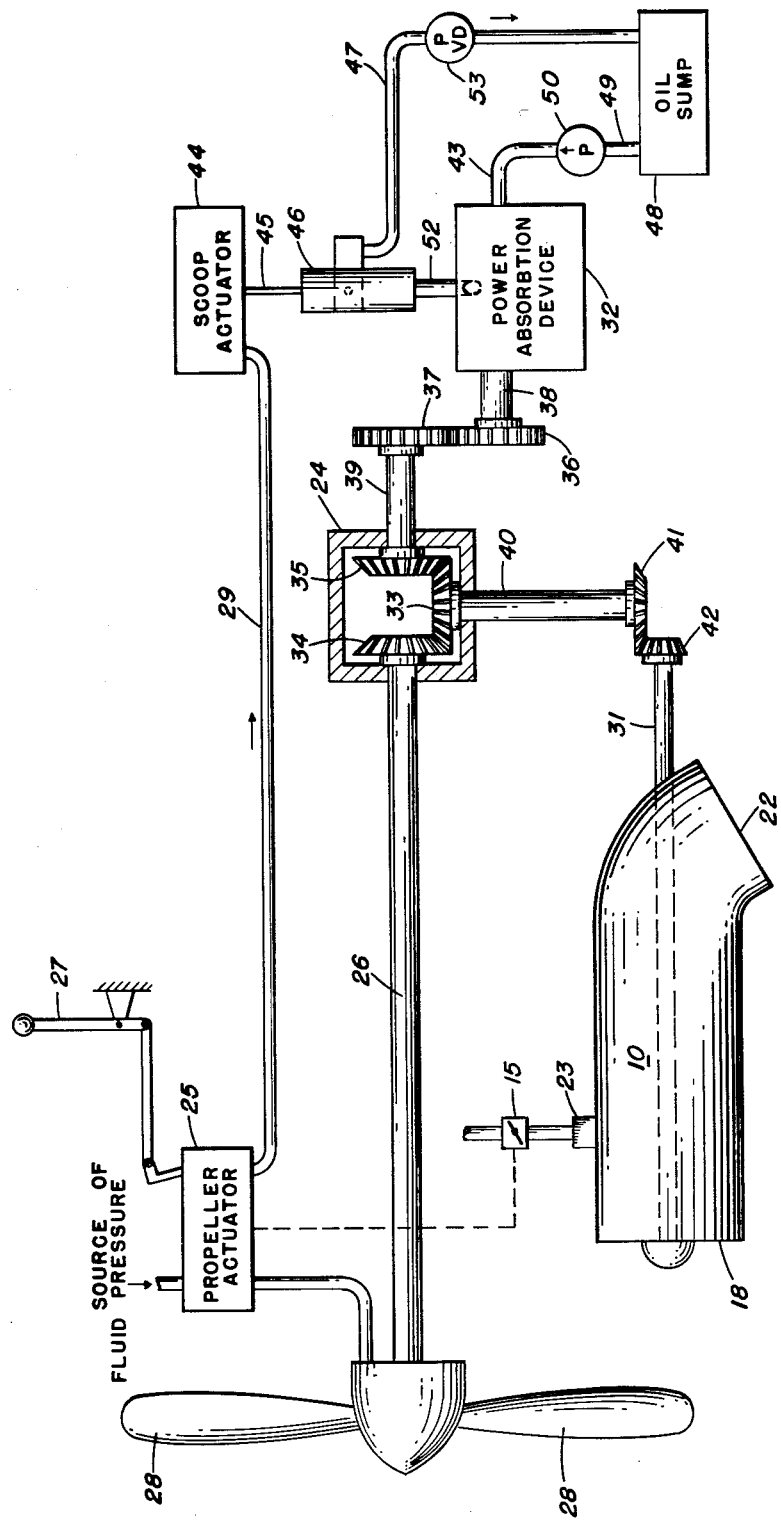
FIG. 3 is a schematic diagram illustrating the manner in which the propeller pitch control, the engine, and the power absorption device of the instant invention are interrelated.

The interaction of the components shown in FIG. 2 is more clearly shown by the schematic diagram of FIG. 3. Shown in FIG. 3 is propeller 28 which is of the common variable pitch type and which is capable of feathering to both positive and negative pitch settings. The pitch of the propeller 28 is controlled by the propeller actuator 25 which is in turn controlled from the cockpit by the pitch control lever 27. Power from the engine 10 is coupled from the turbine section via shaft 31, through the reduction gearing 42 and 41, through shaft 40 to beveled gear 33 which in turn intermeshes with beveled gears 34 and 35 within gear box 24. Beveled gear 34 drives the shaft 26 which in turn drives the propeller 28. The beveled gear 35 drives gear 37 by way of shaft 39 and gear 37 transmits the power through gear 36 and shaft 38 to the power absorption device 32.

The power absorption device, which will be more fully described hereinafter, absorbs the power from the engine in accordance with the amount of fluid which the power absorption device contains. An oil sump 48 is supplied to furnish oil or hydraulic fluid to the power absorption device 32 by line 49 and pump 50. The fluid level within the power absorption device 32 is controlled by a scoop 52 which in turn is slidably disposed within the housing 46. The level to which the scoop 52 extends within the power absorption device 32 is controlled by the scoop actuator 44 through the instrumentality of a rod 45 which is connected to the scoop 52. Scoop actuator 44 is controlled in turn by the propeller actuator 25 by line 29.

It is to be understood that the propeller actuator 25 may also electrically control the scoop actuator 44. By this interconnection the movement of scoop 52 is controlled by the degree of movement of the pitch control lever 27. The housing 46 provides a means by which the fluid which is passed through the scoop 52 may be passed through the line 47 to the oil sump 48. Fluid is passed through scoop 52 due to the fact that in the line 47 is disposed a vacuum pump 53 which in turn maintains a vacuum in the scoop 52.

Figure 4:
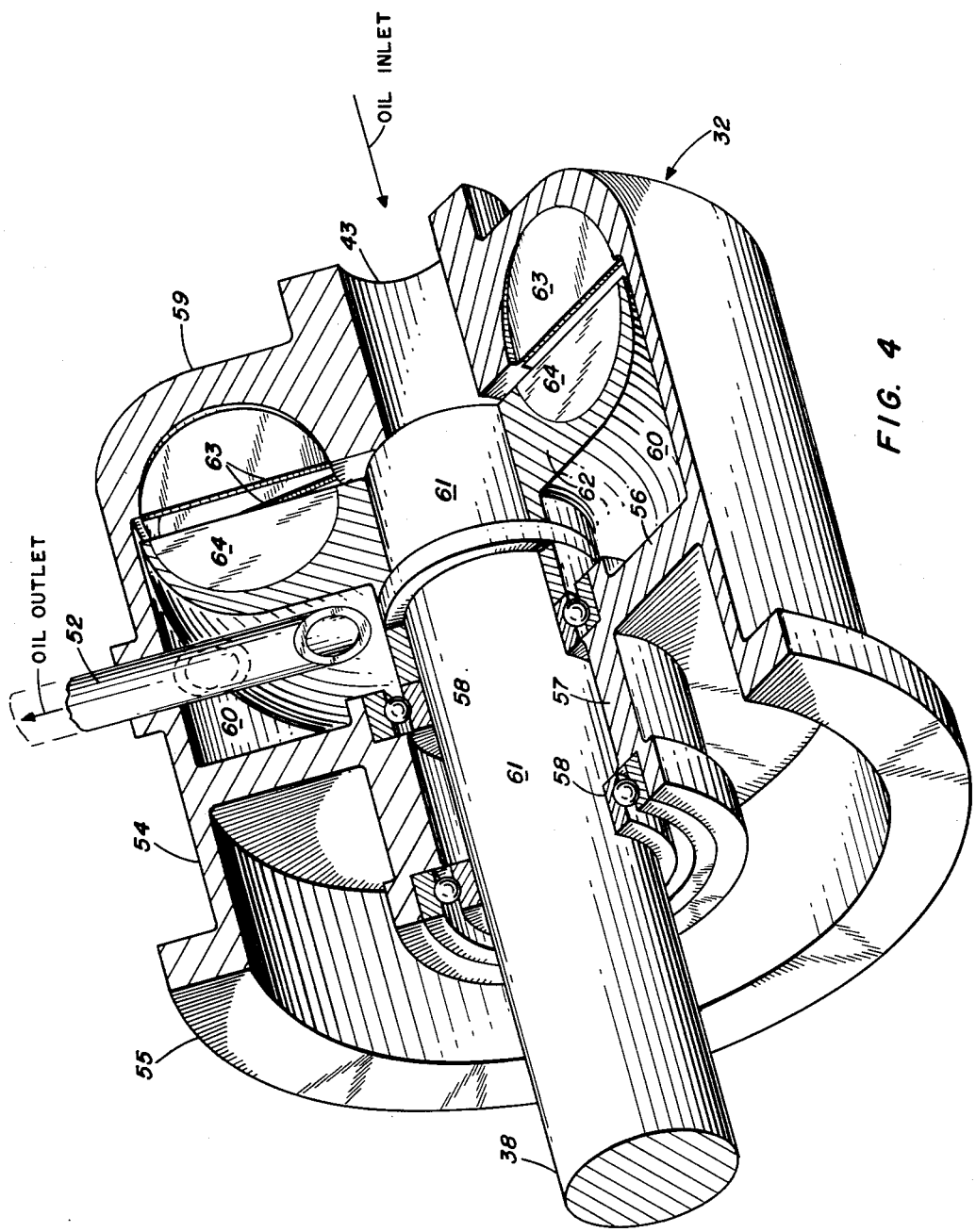
FIG. 4 is an enlarged cutaway view of the power absorption device of the invention.

The power absorption device 32, more clearly shown in FIG. 4, is provided with a housing 54 which is of a generally cylindrical shape and which has a flange 55 by which the device may be mounted. Supported by the casing 54 is rib 56 which in turn supports the bearing support member 57. The shaft 38 is supported within bearings 58 which are in turn supported by the bearing support member 57. The power absorption device 32 is provided with an end member 59 which contains an opening 43 through which fluid is passed to the device from the oil sump 48. There is formed by the rib 56, housing 54, and the end member 59, a chamber 60 into which the fluid from the conduit 43 passes. Also within this chamber 60 is an impeller 62 which is mounted on the shaft 38 by hub 61. The impeller 62 supports rotor vanes 64 which interact through the fluid medium with the stator vanes 63 which are in turn mounted in the end member 59. The scoop 52 is slidably mounted in the casing 54 so that it may be extended to a varying degree within the chamber 60.

The amount of power which can be absorbed by the power absorption device 32 depends upon the level of the fluid within the chamber 60 since the interaction of the rotor vanes 64 and the stator vanes 63 depend upon the amount of fluid between the impeller 62 and the end member 59. If the scoop 52 extends to a great degree within the chamber 60 and retrieves all of the fluid in the chamber 60, there will be no interaction between the rotor vanes 64 and the stator vanes 63, and therefore the power absorption device 32 will be absorbing no power from the shaft 38 since it will be free-wheeling. On the other hand, if the scoop 52 does not extend into the chamber 60 to a very great degree, there will be a substantial amount of fluid within the chamber 60 and consequently a greater magnitude of interaction between the rotor vanes 64 and the stator vanes 63, and therefore a greater power absorption by the shaft 38. The presence of the pump 50 does not negate the effect of the scoop 52 since the pump 53 has a slightly higher capacity then the pump 50. However, it is to be understood that the oil sump, its associated lines and the pumps 50 and 53 are only illustrative of the fluid supply system for distribution of fluid to the power absorption device 32. Any suitable fluid supply system may be utilized in conjunction with the scoop 52 so that the scoop 52 may effectively control the level of fluid in the power absorption device 32.

*Operation*

The operation of the system may be best explained if it is assumed that the system is associated with an aircraft which is about to land. In such an instance, the engine 10 will be operating at a high rate of power in order to supply a sufficient amount of high pressure gas to the boundary layer control system through the outlet 23. At this high state of power output it is not desirable to pass the power to the propeller 28 since it is most desirable for the aircraft to maintain maximum lift with the slowest possible speed during the approach to the ground. The pilot actuates the pitch control lever 27 which in turn controls the angle of pitch of the propeller 28 through the propeller actuator 25. The propeller actuator 25 also controls the scoop actuator 44 by applying pressure through the line 29. The power from the engine 10 is applied through shaft 31, gear 42, gear 41, shaft 40 to beveled gear 33 within gear box 24. The power may be taken from beveled gear 33 either by beveled gear 34 which drives the propeller 28 or beveled gear 35 which is connected to the power absorption device through shaft 39, gear 37, gear 36 and shaft 38. The beveled gear 33 will drive whichever of the beveled gears 34 or 35 that provides the most amount of resistance to rotation. If the beveled gears 34 and 35 furnish approximately the same amount of resistance then the power from shaft 40 will be transmitted to the two beveled gears 34 and 35 in approximately equal magnitudes. As the aircraft approaches the landing field, less and less power is needed by the prop, therefore, as the pilot reduces the amount of pitch of the propeller 28, by actuating the pitch control lever 27, the scoop actuator, by rod 45, begins to retract the scoop 52, which has been fully extended into the power absorption device 32, from the power absorption device 32. As the scoop 52 is retracted from its most extended position, the fluid level in the power absorption device 32 begins to rise and consequently more interaction takes place between the rotor vanes 64 and the stator vanes 63 thereby producing more resistance to the turning of the impeller 62 and which consequently provides more resistance to rotation of the beveled gear 35. When the aircraft finally reaches the position where no power is needed by the propeller 28, the pilot has moved the pitch control lever 27 to a position which has effected the scoop actuator in such a manner that the scoop 52 has been fully retracted by the power absorption device 32 and consequently the power absorption device provides the maximum amount of resistance to rotation for the gear 35.

The above operation is accomplished while maintaining the engine 10 at a constant r.p.m. which consequently provides a constant flow of high pressure gases through the bleed-off 23 from the compressor to the boundary layer control system. It may, however, be desirable to control the amount of boundary layer control gases which are bled from the engine 10 while maintaining a constant r.p.m. This may be accomplished by controlling the valve 15. This may be accomplished by use of a separate control device in the cockpit which in turn controls the valves 15, or in the alternative it may also be effected by means of the propeller actuator 25. That is to say, it is within the contemplated scope of the invention that a propeller actuator may be utilized which is of a character adapted to control not only the pitch of the propeller but simultaneously or contemporaneously therewith coordinate the action of the power absorption device 32 and the degree of opening of the valve 15.

It is to be understood that the gear box 24 may be replaced by a clutching system which could operate automatically or could be controlled to switch the output of the engine to the propeller or to the power absorption device, or to both.

As is apparent from the foregoing description, the present invention provides a unique system whereby an aircraft which utilizes turbo-jet or turbo-prop engines and boundary layer control may sustain short field take-off and landing characteristics by employing a power absorption device which will absorb the power output of the turbo-prop engine, which is running at a high power rate to furnish sufficient high pressure gases to the boundary layer control system, so that the power output will not be transmitted to the propeller of the aircraft.

The invention has been described in an illustrative manner and it is to be understood that the terminology which has been used herein is intended to be in the nature of words of description rather than of limitation.

Obviously many modifications and variations of the present invention are possible in the light of the above teachings. It is therefore to be understood that within the scope of the appended claims the invention may be practiced otherwise than as specifically described.

What is claimed is:

1. In combination with an aircraft having a turbo-jet engine, said engine having a compressor and turbine operatively connected together, a turbine output shaft extending from said turbine, the improvement comprising,
   reduction gear means having at least an output shaft,
   air bleed means connected to said compressor,
   boundary layer forming means receiving air from said bleed means and supplying said bleed air to the wing surfaces,
   said engine output shaft being coupled to reduction gear means,
   said reduction gear means output shaft having a variable pitch propeller mounted thereon,
   power absorbing means operatively connected to said reduction gear means,
   control means for varying the amount of power absorbed by said power absorbing means,
   whereby the r.p.m. of said engine may be increased thus providing a greater amount of bleed air which may be used to increase the lift coefficient while the r.p.m. of said propellers may be maintained at a constant r.p.m. by means of said power absorption means.

2. In combination, apparatus of the character described in claim 1, wherein said bleed means comprises,
   a valve operatively attached to said compressor permitting high pressure air to be drawn from said compressor.

3. In combination, apparatus of the type described in claim 2 wherein said boundary layer means comprises,
   a conduit attached to said bleed valve,
   said conduit leading to the trailing edge of said wings,
   outlets at the trailing edge of said wings, permitting the high pressure air to form a boundary layer and thus increase the lift coefficient.

4. In combination, apparatus of the type described in claim 3 wherein said reduction gear means comprises,
   a first reduction gear output,
   a second reduction gear output,
   said power absorbing means being attached to said second reduction gear output.
   said propeller shaft being operatively connected to said second reduction gear output.

5. Apparatus of the character described in claim 4 wherein said power absorbing means comprises,
   a housing closed at one end,
   a partition at the opposite end extending radially inwardly,
   said partition terminating in an annular aperture,
   bearing means mounted in the ends of said aperture,
   an input shaft extending through said aperture and journalled in said bearings,
   a working chamber formed intermediate said closed end and said partition,
   a fluid inlet in said closed end and an outlet in the wall of said housing,
   said outlet being located in close proximity to said working chamber,
   a plurality of stator vanes mounted in the closed end within said working chamber,
   said stator vanes being radially spaced about said inner wall,
   an impeller rotatably mounted on said shaft,
   said impeller having a plurality of vanes mounted therein,
   fluid supply means in fluid communication to and from said working chamber,
   and flange means at the end of said housing for mounting said power absorbing unit to a mounting pad.

6. In a combination, apparatus of the type described in claim 5 wherein said control means comprises,
   a scoop tube which projects into said working chamber of said thrust absorbing unit,
   actuator means operatively connected to a control lever,
   said actuator varying the depth of said scoop tube into said working chamber thus controlling the level of fluid therein which controls the amount of power absorbed thereby.

7. In combination,
an aircraft,
a propeller,
a turbo-jet engine means for rotating said propeller,
a boundary layer control means for utilization of compressed fluid from said engine,
power absorption means connected to said engine for absorbing power therefrom,
control means for proportionally applying the power output of said engine in varying proportions between said propeller and said power absorption means.

8. The combination of structure of the type set forth in claim 7 further including in combination,
valve means disposed between the boundary layer control means and the engine means for controlling the amount of compressed fluid flow therebetween.

9. In an aircraft having lift surfaces,
a compressor turbine type turbo-jet engine,
a boundary layer control system means for supplying fluids to said lift surfaces,
said boundary layer control system means being operatively connected to the compressor of said engine for receiving high pressure fluid therefrom,
a propeller,
drive means for transmitting power from said engine to said propeller,
a power absorption device,
power transmitting means for transmitting power from said engine to said power absorption means,
a control means for varying the amount of power the power absorption means will absorb.

10. In combination with the apparatus of claim 9 wherein,
a valve means is disposed between said boundary layer control system means and said compressor of said engine for controlling the amount of high pressure fluid flow therebetween.

11. The combination of the type set forth in claim 10 wherein,
said control means also regulates the position of said valve means.

12. In combination,
a fixed wing aircraft,
at least one turbo-jet engine comprising a compressor, a combustion chamber and a turbine,
a propeller,
a first gear means,
a shaft means for transmitting power from said engine to said first gear means,
a propeller gear means,
said propeller gear means being operatively connected with said propeller for transmitting power thereto,
said propeller gear means being operatively connected with said first gear means in a manner to be driven thereby,
a fluid type power absorption device,
a power absorption device gear means,
said power absorption device being operatively connected to said power absorption device gear means so as to be driven thereby,
said power absorption device gear means being operatively connected with said first gear means so as to be driven thereby,
a control means for varying the amount of power the power absorption device will absorb,
a boundary layer control means for supplying fluids to the wings of said aircraft,
a conduit means for ducting fluid from the compressor of said engine to said boundary layer control means.

13. The combination of the type set forth in claim 12 wherein,
said aircraft has a plurality of said engines,
and wherein the compressor of each of said engines supplies high pressure fluid via a respective one of said conduit means to the boundary layer control means.

14. In combination,
an aircraft,
at least one turbo-jet engine,
said engine comprising a compressor means and a turbine means,
a variable pitch propeller,
a propeller power transmittal means for transferring power to said variable pitch propeller,
a power absorption device,
a power absorption device power transmittal means for transferring power to said power absorption device,
a power distribution means for distribution of power between said propeller power transmittal means and said power absorption device power transmittal means,
said power distribution means being operatively connected to said turbine so as to be driven thereby,
a boundary layer control means for said aircraft,
said boundary layer control means being operatively connected with said compressor means to receive high pressure fluid therefrom,
a control means for varying the pitch of said variable pitch propeller and for varying the power absorbing capacity of said power absorption device.

15. The combination of elements of the type set forth in claim 14 further including,
a valve means disposed between said compressor means and said boundary layer control means for controlling the high pressure fluid flow therebetween.

16. The combination of the type set forth in claim 15 wherein,
said control means also regulates the position of said valve means.

17. In combination,
an aircraft,
at least one turbo-jet engine,
said engine comprising a compressor means driven by a turbine means,
a power distribution means operatively connected to said turbine means so as to be driven thereby,
a power absorption means,
said power absorption means comprising an enclosed chamber,
shaft means extending into said chamber,
an impeller fixedly secured to said shaft,
rotor vanes circumferentially disposed around said impeller so as to face an extremity of said chamber,
stator vanes disposed in the extremity of said chamber in juxtaposition to said rotor vanes,
a first control means for supplying fluid to said chamber and for regulating the fluid level in said chamber,
said shaft means being operatively connected to said power distribution means so as to be driven thereby,
a variable pitch propeller,
a drive means for transmitting power to said propeller,
said drive means being connected to said power distribution means in a manner to be driven thereby,
a boundary layer control means for said aircraft,
a conduit means disposed between said compressor means and said boundary layer control means for passing high pressure fluid from said compressor means to said boundary layer control means,
a pitch control and regulating means for varying the pitch of said propeller and for regulating said first control means.

18. The combination of elements of the type set forth in claim 17 further including in combination,
a valve means disposed in said conduit means for regulating the fluid flow from said compressor means to said boundary layer control means.

19. The combination of elements of the type set forth in claim 18 wherein,
said pitch control means controls the position of said valve means also so as to control the fluid flow from said compressor means to said boundary layer control means.

20. In combination,
an aircraft,
at least one turbo-jet engine,
said engine comprising a compressor means and a turbine means,
a power distribution means,
said power distribution means being driven by said turbine means,
a power absorption means,
said power absorption means comprising an enclosed chamber with interconnected oppositely facing first and second end walls,
a shaft extending through said first end wall,
an impeller fixedly secured to said shaft and disposed in juxtaposition to said second end wall,
rotor vanes disposed in the face of said impeller in juxtaposed relation to said second end wall,
stator vanes disposed in said second end wall for cooperation with said motor vanes upon rotation of said impeller,
a liquid supply means for supplying liquid to said chamber,
a slidably disposed tube extending into said chamber,
a tube actuation means for moving said tube into and out of said chamber,
a liquid transfer means for transferring liquid from said tube to a return line for said liquid supply means,
a vacuum means disposed in said return line for creating low pressure at the end of said tube which extends into said chamber so that liquid will be withdrawn from said chamber,
said shaft being connected to said power distribution means so as to be driven thereby,
a variable pitch propeller,
a propeller drive means connected to said power distribution means so as to be driven thereby,
a boundary layer control means for said aircraft,
a conduit means connecting said compressor means with said boundary layer control means for passing high pressure fluid from said compressor means to said boundary layer control means,
a control means for varying the pitch of said propeller and for actuating said tube actuation means.

21. The combination of elements of the type set forth in claim 20 further including in combination,
a valve means disposed in said conduit means for controlling the amount of fluid flow from said compressor means to said boundary layer control means, 22. The combination of elements of the type claimed in claim 21 wherein said control means also regulates the position of said valve means.

23. The combination as set forth in claim 7, wherein said power absorption means comprises,
an enclosed chamber with oppositely facing first and second end walls,
a shaft extending through said first end wall,
an impeller fixedly secured to said shaft with the impeller face disposed in juxtaposition to said second end wall,
rotor vanes disposed in said impeller face, stator vanes secured in said second end wall for cooperation with said rotor vanes upon rotation of said impeller,
a liquid supply means for supplying liquid to said chamber,
a tube slidably disposed in a wall of said chamber above the liquid in said chamber and extending toward the lowermost level of said liquid,
a tube actuation means for moving said tube to various degrees of extension into said chamber,
a liquid transfer means surrounding said tube for transferring liquid from said tube to a line returning to said liquid supply means,
a vacuum means connected with said tube for creation of a low pressure area at the end of said tube which extends into said chamber,
whereby the liquid level in the chamber will be controlled to thereby control the amount of drag the impeller will transmit to the shaft due to the interaction of the rotor and stator vanes via the liquid.

References Cited by the Examiner

UNITED STATES PATENTS

| | | | |
|---|---|---|---|
| 2,514,513 | 7/1950 | Price | 244—42.41 |
| 2,605,983 | 8/1952 | Stalker | 244—53 |
| 2,990,919 | 7/1961 | Christenson et al. | 188—90 |
| 3,016,991 | 1/1962 | Lyne | 188—90 |
| 3,029,902 | 4/1962 | Jarvis | 188—90 |
| 3,051,273 | 8/1962 | Cordiano et al. | 188—90 |
| 3,056,422 | 10/1962 | Abraham | 188—90 |
| 3,072,222 | 1/1963 | Kugel et al. | 188—90 |
| 3,123,322 | 3/1964 | Jacksen et al. | 244—42 |

MILTON BUCHLER, *Primary Examiner.*

B. BELKIN, *Assistant Examiner.*